United States Patent
Kim

(10) Patent No.: US 10,305,346 B2
(45) Date of Patent: May 28, 2019

(54) COUPLER AND MOTOR HAVING THE SAME

(71) Applicant: LG INNOTEK CO., LTD., Seoul (KR)

(72) Inventor: Yong Joo Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 245 days.

(21) Appl. No.: 15/166,690

(22) Filed: May 27, 2016

(65) Prior Publication Data

US 2016/0352184 A1    Dec. 1, 2016

(30) Foreign Application Priority Data

May 28, 2015 (KR) .................. 10-2015-0075387

(51) Int. Cl.
*H02K 7/00* (2006.01)

(52) U.S. Cl.
CPC .................. *H02K 7/003* (2013.01)

(58) Field of Classification Search
CPC .......... H02K 7/003; F16D 1/10; F16D 1/104; F16D 1/116; A47J 43/0716; A47J 43/085; A47J 43/046
USPC .............. 310/75 D, 90; 74/11, 15.6; 403/360
See application file for complete search history.

(56) References Cited

U.S. PATENT DOCUMENTS

| | | | |
|---|---|---|---|
| 4,955,724 A * | 9/1990 | Otto | A47J 43/085 277/390 |
| 7,888,831 B2 * | 2/2011 | Court | H02K 11/215 310/261.1 |
| 9,084,512 B2 * | 7/2015 | Boozer | A47J 43/0716 |

FOREIGN PATENT DOCUMENTS

| | | |
|---|---|---|
| KR | 1020080097290 A | 11/2008 |
| KR | 1020130046111 A | 5/2013 |
| KR | 20140037887 A | 3/2014 |
| WO | WO-2012158685 A1 | 11/2012 |

* cited by examiner

*Primary Examiner* — Burton S Mullins
(74) *Attorney, Agent, or Firm* — Saliwanchik, Lloyd & Eisenschenk

(57) ABSTRACT

A motor and a coupler disposed therein are provided. The motor includes a housing, a stator disposed in the housing, a rotor rotatably disposed inside the stator, a rotating shaft which integrally rotates with the rotor, a bearing which supports the rotating shaft, a bracket disposed at an upper portion of the housing, wherein the bearing is mounted in the bracket, and a coupler disposed at an upper end portion of the rotating shaft which passes through and protrudes from the bracket, wherein the coupler is in contact with the bracket due to a pressure generated when an external system is coupled with the coupler. Accordingly, damage to the bearing and noise occurrence are prevented in advance in the motor including the coupler.

2 Claims, 4 Drawing Sheets

COUPLER AND MOTOR HAVING THE SAME

CROSS-REFERENCE TO RELATED APPLICATION

This application claims priority under 35 U.S.C. § 119 to Korean Patent Application No. 2015-0075387, filed May 28, 2015, which is hereby incorporated by reference in its entirety.

BACKGROUND

1. Field of the Invention

The present invention relates to a coupler capable of reducing noise, and a motor having the same.

2. Discussion of Related Art

A motor is an apparatus which implements a driving force by interaction between a stator and a rotor.

Such a motor may be classified as a variable voltage motor based on a direct current system and a three-phase induction motor based on an alternating current system. For instance, the motor is used as a traction motor, which implements a traction force, in systems such as an elevator, a vehicle, and the like. In addition, the motor is used as an electronic power steering system (EPS) to ensure steering stability of a vehicle.

Among these, the EPS enables a driver to drive safely by ensuring cornering stability and providing quick restoring force of a steering because an electronic control unit (ECU) drives the motor according to driving conditions sensed from a vehicle speed sensor, a torque angle sensor, a torque sensor, and the like. The EPS enables the driver to perform a steering operation with less power as the motor supplements the torque of a steering wheel that the driver operates.

In this case, the motor is provided with a coupler which couples a medium, such as a steering shaft, and a rotating shaft of the motor.

When an external system and the motor are coupled, a strong pressure is applied to the coupler, which presses a bearing that supports the rotating shaft, and a noise problem occurs.

BRIEF SUMMARY

An embodiment of the present invention is provided to resolve the above-described problem, particularly a support protrusion having a protruding structure is provided at a lower end of a coupler to which an external apparatus is coupled, and a formation position of the support protrusion is aligned with a bracket portion which is outside of a bearing mounting portion so that the support protrusion is in contact with the bracket first even when the coupler exerts a strong pressure in a downward direction, and thereby damage to the bearing and noise occurrence may be prevented in advance.

The present invention is directed to providing a coupler including a support protrusion supported by a bracket to prevent damage to a bearing and noise occurrence in advance.

The technical objectives of the inventive concept are not limited to the above disclosure, and other objectives may become apparent to those of ordinary skill in the art based on the following descriptions.

One aspect of the present invention provides a motor including a housing; a stator disposed in the housing; a rotor rotatably disposed inside the stator; a rotating shaft which integrally rotates with the rotor; a bearing which supports the rotating shaft; a bracket disposed at an upper portion of the housing, wherein the bearing is mounted in the bracket; and a coupler disposed at an upper end portion of the rotating shaft which passes through and protrudes from the bracket, wherein the coupler is in contact with the bracket by a pressure generated when an external system is coupled with the coupler.

The coupler may include an outer body with which the external system is coupled; an inner body which protrudes downward from the outer body, wherein a second engaging portion to be coupled to the rotating shaft is formed in the inner body; and a support protrusion formed to extend and protrude from a lower portion of the outer body, wherein the support protrusion may be in contact with the bracket by the pressure generated when the external system is coupled with the coupler.

In addition, the support protrusion be disposed separately from the second engaging portion.

In addition, an end of the support protrusion may be formed to protrude further than an end of the second engaging portion.

Further, a disposing position of the support protrusion may correspond to a surface of the bracket besides a portion where the bearing is disposed in a perpendicularly downward direction of the support protrusion.

Meanwhile, the outer body may include a main body in a cylindrical shape and a first engaging portion formed to protrude inward from the main body.

In addition, the support protrusion may be formed to extend from a lower portion of the main body.

Another aspect of the present invention provides a coupler coupled to a rotating shaft of a motor including an outer body having a main body in a cylindrical shape, and a first engaging portion formed to protrude inward from the main body; an inner body having a coupling portion which is one side of the inner body and is coupled to a first engaging portion, and a second engaging portion formed to protrude in an axial direction of the rotating shaft from the other side; and a support protrusion formed to extend from the main body.

Further, the support protrusion may be disposed separately from the second engaging portion.

In addition, an end of the support protrusion may be formed to protrude more than an end of the second engaging portion.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which.

DETAILED DESCRIPTION

Figure 1:
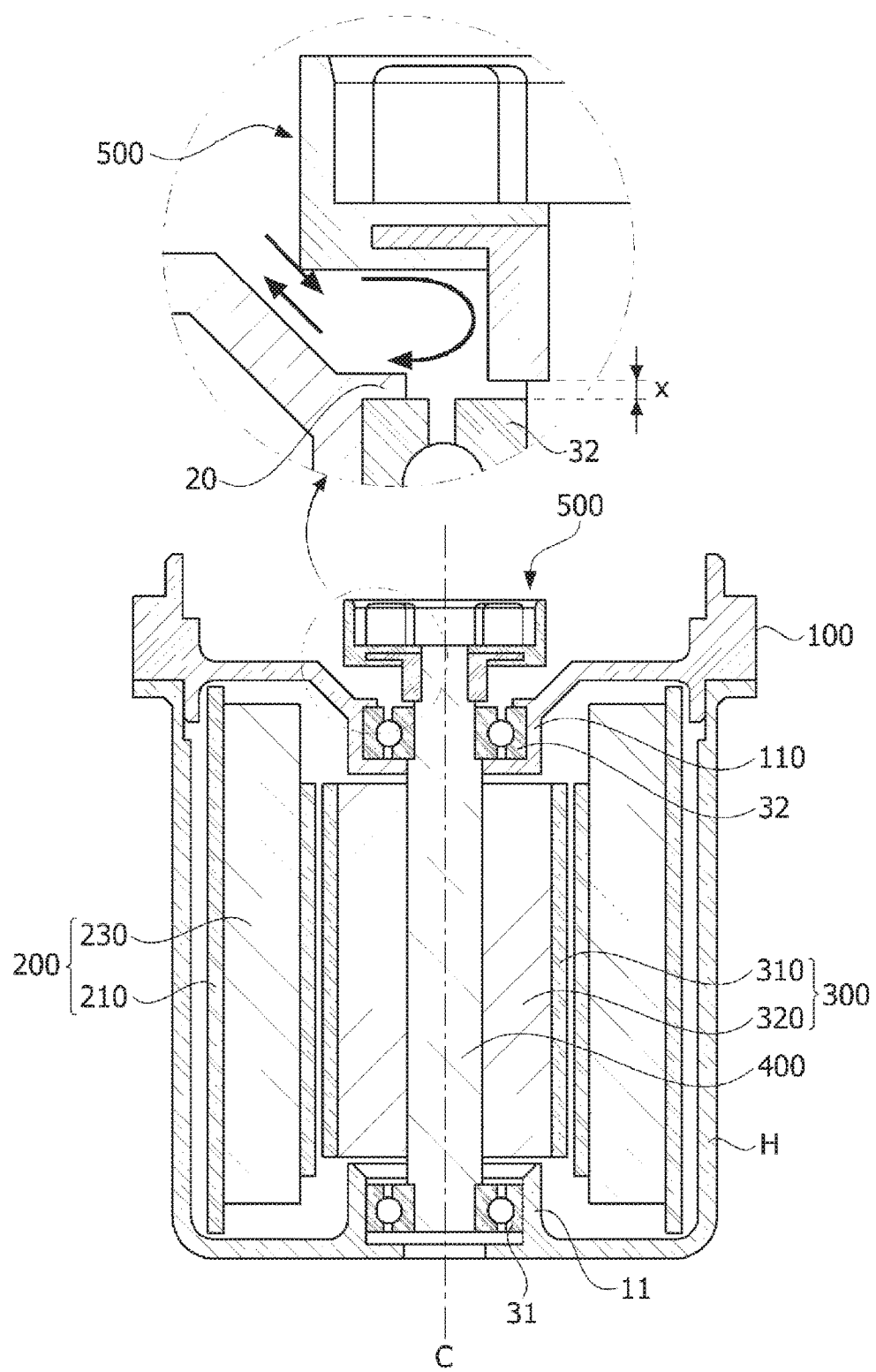
FIG. 1 is a cross sectional view illustrating a motor.

Since the present invention may have various embodiments and various modifications may be made in the embodiments, some particular embodiments of the present invention will be illustrated and described herein. However, these are not intended to limit the inventive concept to a particular embodiment, and it should be understood that various equivalents or modifications that may substitute these embodiments are included in the technical scope and the spirit of the invention.

It should be understood that, although the terms "first," "second," etc. may be used herein to describe various elements, these elements are not be limited by these terms. These terms are only used to distinguish one element from another. For instance, a first element could be termed a second element without departing from the teachings of the present inventive concept, and similarly a second element may be termed a first element as well. The term "and/or" includes any and all combinations of one or more of the associated listed items.

It should be understood that when an element is referred to as being "connected to," or "coupled to" another element, it may be directly connected or coupled to the other element, or intervening elements may be present therebetween. In contrast, when an element is referred to as being "directly connected to," or "directly coupled to" another element, there is no intervening element present.

In describing embodiments, when an element is referred to as being formed "on or under" another element, the two elements may be in direct contact with each other or in indirect contact with each other having one or more of intervening elements disposed therebetween. In addition, when an element is described as being "on or under" another element, this may encompass both of an upward direction and a downward direction based on an element.

The terminology used herein is to describe particular embodiments of the invention but is not intended to limit the scope of the inventive concept. As used herein, the singular form is intended to include the plural form as well, unless the context clearly indicates otherwise. It should be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this inventive concept belongs. It should be further understood that terms, such as those defined in commonly used dictionaries, should be interpreted as having a meaning that is consistent with their meaning in the context of the relevant art and are not to be interpreted in an idealized or overly formal sense unless expressly so defined herein.

Hereinafter, embodiments according to the present invention will be described in detail with reference to the accompanying drawings. In the description with reference to the accompanying drawings, like or corresponding elements are designated by the same reference numerals regardless of drawing numbers, and duplicated descriptions thereof will be omitted.

Figure 2:
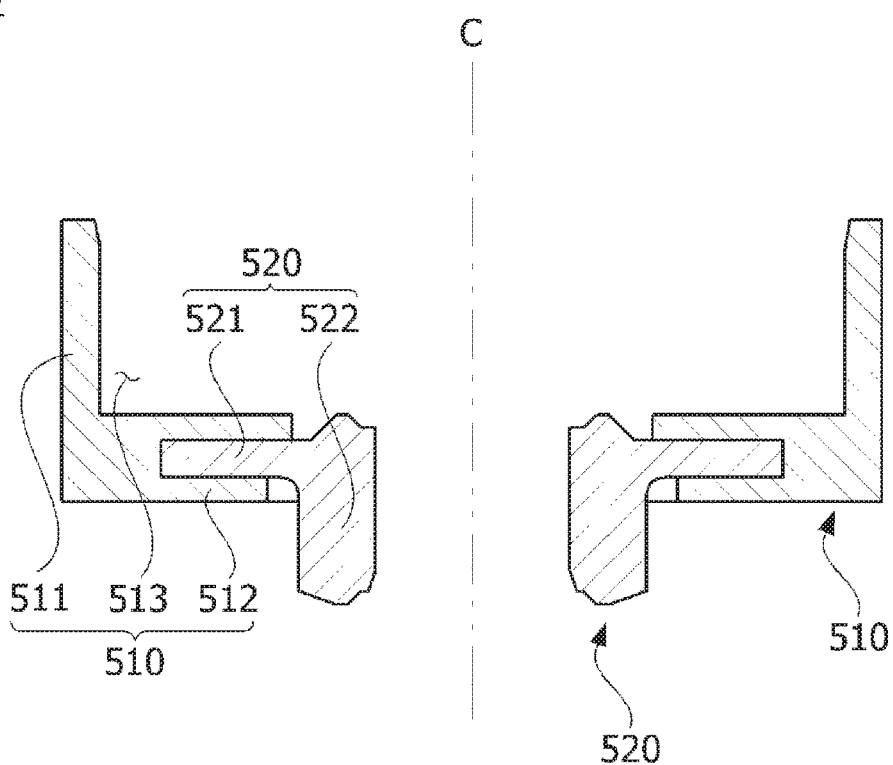
FIG. 2 is a cross sectional view of a coupler disposed in the motor shown in FIG. 1.
Figure 3:
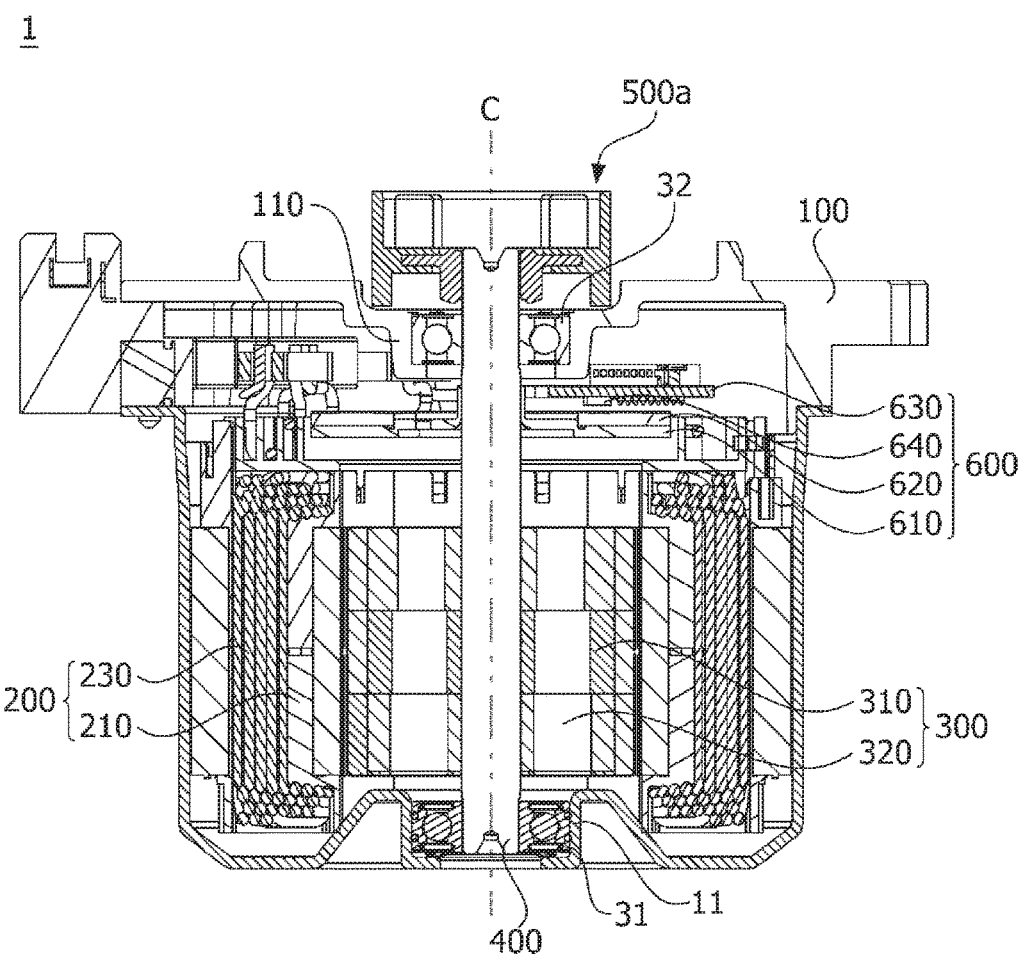
FIG. 3 is a cross sectional view illustrating a motor according to an embodiment of the present invention.
Figure 4:
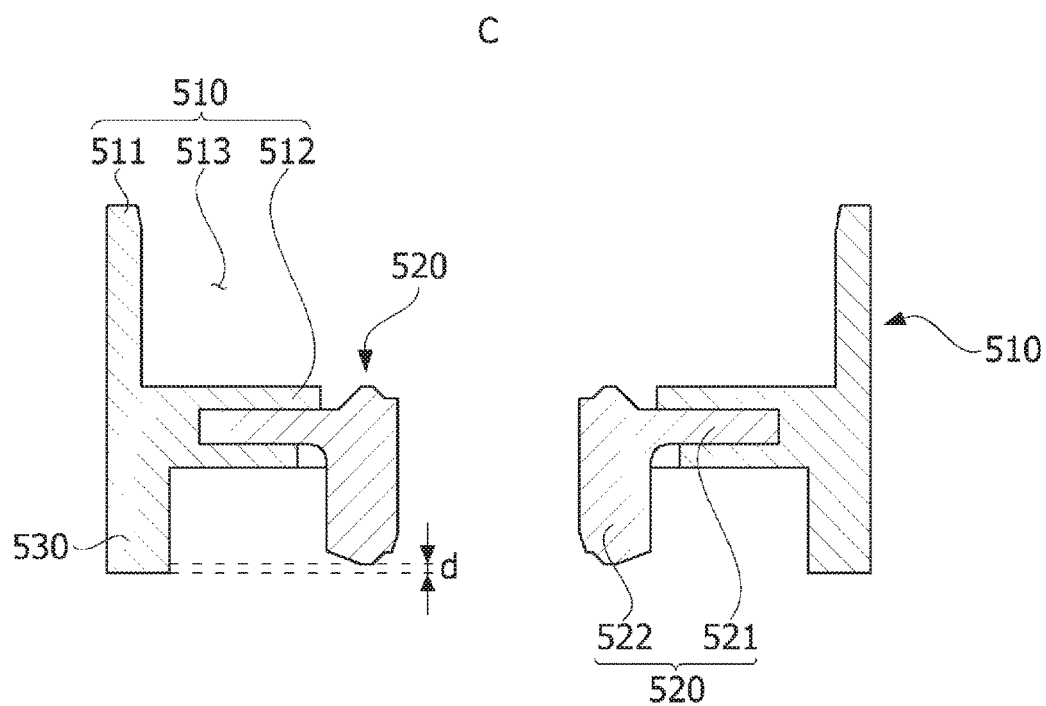
FIG. 4 is a cross sectional view of a coupler disposed in the motor according to the embodiment of the present invention.

FIG. 1 is a cross sectional view illustrating a motor, and FIG. 2 is a cross sectional view of a coupler disposed at the motor shown in FIG. 1. FIG. 3 is a cross sectional view illustrating a motor according to one embodiment of the present invention, and FIG. 4 is a cross sectional view of a coupler disposed at the motor according to one embodiment of the present invention.

Referring to FIGS. 1 and 2, the motor may include a housing H, a bracket 100 disposed on the housing H, a stator 200 disposed in the housing H, a rotor 300 rotatably installed inside the stator 200, a rotating shaft 400 disposed at the center of the rotor 300, and at least two bearings 31 and 32 which support the rotating shaft 400.

An upper surface of the housing H is open, and a support duct 11 protrudes from a central portion of a lower surface of the housing H. In addition, the bracket 100 is coupled to an upper portion of the housing H to form an internal space.

A first bearing 31 is installed at the support duct 11, and a second bearing 32 is installed at the bracket 100.

The first bearing 31 and the second bearing 32 support and are in contact with the rotating shaft 400 so that the rotating shaft 400 is rotatable.

As illustrated in FIG. 1, an upper portion of the rotating shaft 400 is supported by the second bearing 32 and a lower portion of the rotating shaft 400 is supported by the first bearing 31.

The second bearing 32 may be disposed at a bearing mounting portion 110 of the bracket 100. Here, as illustrated in FIG. 1, the bearing mounting portion 110 may be formed to be concave toward the internal space.

An upper end portion of the rotating shaft 400 passes through the bracket 100 and upwardly protrudes to be coupled to a coupler 500 coupled to a steering shaft (not shown) which is one of external systems.

In the internal space formed by the housing H and the bracket 100, the stator 200 and the rotor 300 are installed.

The stator 200 may include a stator core 210 disposed between a magnet 310 of the rotor 300 and the housing H, and a coil 230 wound on the stator core 210.

As an example, the stator 200 may include a plurality of stator core units, each of which has a tooth protruding from ahead portion, an insulator, and a coil.

The rotor 300 rotatably disposed at the center of the stator 200 may include a through hole formed in the center thereof and a magnet module.

Referring to FIG. 1, the rotor 300 may include a rotor core 320 coupled to the rotating shaft 400, and the magnet 310 coupled to an outer circumferential surface of the rotor core 320. Although a structure of the magnet 310 coupled to the outer circumferential surface of the rotor core 320 was taken as an example in the embodiment, an alternative structure in which the magnet 310 is inserted into the rotor core 320 also may be applied to the rotor 300.

In the above-described structure, when a current is applied to the stator 200, the rotating shaft 400 is rotated according to the rotation of the rotor 300 by an interaction between the stator 200 and the rotor 300.

Meanwhile, the motor including the coupler 500 which couples the steering shaft (not shown), which is one of external systems, and the rotating shaft 400 of the motor may transfer a driving force to the steering shaft.

Referring to FIGS. 1 and 2, the coupler 500 is constituted by including an outer body 510 having a first engaging portion 512 configured to form a concave groove 513 coupled to the steering shaft, and an inner body 520 which protrudes downward from the outer body 510 and is coupled to the rotating shaft 400 of the motor.

As illustrated in FIG. 2, the outer body 510 may include a main body 511 in a cylindrical shape, the first engaging portion 512 formed to protrude inward from the main body 511, and the concave groove 513 formed by the main body 511 and the first engaging portion 512. Here, the steering shaft may be engaged with the concave groove 513.

In addition, the inner body 520 may include a coupling portion 521 which is one side of the inner body 520 and is coupled to the first engaging portion 512, and a second engaging portion 522 formed to protrude downward from the other side. Here, the second engaging portion 522 is coupled to the rotating shaft 400 of the motor.

In the case that an external system of a target to which a driving force is transferred, for instance, a motor driven power steering (MDPS) system, is engaged with the motor by a medium of the coupler 500, a strong engaging force up to maximum of about 30 Kgf is applied in a shaft direction C of the motor, and the second engaging portion 522 of the coupler 500 strongly presses the second bearing 32 disposed a separation space x therefrom. Accordingly, the second bearing 32 may be damaged or a friction between the second bearing 32 and the second engaging portion 522 may occur, and thereby noise occurs while the motor is driven.

In addition, an air vortex occurs between the bracket 100 and the coupler 500 while the motor is driven (see the arrow in FIG. 1). Therefore, noise occurs.

Referring to FIGS. 3 and 4, a motor 1 according to one embodiment of the present invention may resolve the above-described noise problem by forming a support protrusion 530 at an outer circumferential surface of a coupler 500a to be in contact with a bracket 100.

In describing the motor 1, an electronic power steering system (EPS) motor will be taken as an example. However, the motor 1 may be applied to various types of motors including a traction motor which implements a traction force in a system, such as an elevator, a vehicle, etc., as a matter of course.

Referring to FIGS. 3 and 4, the motor 1 according to one embodiment of the present invention may include a housing H, a bracket 100 disposed on the housing H, a stator 200 disposed in the housing 11, a rotor 300 rotatably installed at a center of the stator 200, a rotating shaft 400 disposed at the center of the rotor 300, and bearings 31 and 32 which support the rotating shaft 400.

In addition, the motor 1 including the coupler 500a according to one embodiment of the present invention, which couples a steeling shaft (not shown) and the rotating shaft 400 of the motor 1, may transfer a driving force to the steering shaft.

The coupler 500a may include an outer body 510, an inner body 520, and a support protrusion 530. Referring to FIGS. 2 and 4, the coupler 500a, unlike the above-described coupler 500, includes the support protrusion 530 which extends and protrudes from a lower portion of the outer body 510.

Referring to FIG. 4, the outer body 510 may include a main body 511 in a cylindrical shape, a first engaging portion 512 formed to protrude inward from the main body 511, and a concave groove 513 formed by the main body 511 and the first engaging portion 512. Here, the steering shaft may be engaged with the concave groove 513.

In addition, the first engaging portion 512 may be formed to protrude from the main body 511 toward an axis C so that the concave groove 513 is formed. Here, the axis C may be a virtual line that passes through the center of the rotating shaft 400 of the motor 1.

As illustrated in FIG. 4, a cross section of one side of the outer body 510 formed to be symmetrical about the axis C may be formed as an L shape.

The inner body 520 may include a coupling portion 521 which is one side of the inner body 520 and is coupled to the first engaging portion 512 and a second engaging portion 522 formed to protrude downward from the other side. Here, the second engaging portion 522 is coupled to the rotating shaft 400 of the motor 1.

As illustrated in FIG. 4, the second engaging portion 522 of the inner body 520 is formed to protrude downward from a lower portion of the first engaging portion 512, and may be coupled to the rotating shaft 400 of the motor 1.

The support protrusion 530 is formed to protrude from a lower portion of an outer side of the outer body 510, and may be disposed separately from the second engaging portion 522 of the inner body 520. Here, the term "outer side" refers to an outer side from the first engaging portion 512 with respect to the axis C.

For example, as illustrated in FIG. 4, the support protrusion 530 may be formed to extend downward from the main body 511.

The support protrusion 530 serves the function of preventing the second engaging portion 522 of the coupler 500a from directly pressurizing the second bearing 32 by a pressure that occurs when the coupler 500a is engaged with an external system such as a steering wheel or by a pressure due to a weight of the external system.

To this end, the support protrusion 530 may be implemented as a structure in which the support protrusion 530 protrudes more downward than an end of the second engaging portion 522 by a predetermined protrusion length d.

Therefore, when the coupler 500a is pushed downward by a pressure, an end of the support protrusion 530 may be in contact with a surface of the bracket 100 before the end of the second engaging portion 522.

Consequently, the support protrusion 530 formed to protrude more downward than the end of the second engaging portion 522 prevents the second engaging portion 522 from being in contact with the second bearing 32.

Therefore, when the coupler 500a is disposed on the motor 1, the support protrusion 530 may be disposed at a position corresponding to a surface of the bracket 100 as shown in FIG. 3 or an outer surface of the bracket 100 such as a protrusion 20 of the bearing mounting portion 110 as shown in FIG. 1.

That is, a disposing position of the support protrusion 530 corresponds to the surface of the bracket 100 except for a portion where the second bearing 32 is disposed in a perpendicularly downward direction of the support protrusion 530.

As an example of the above, as illustrated in FIG. 4, a position of the support protrusion 530 may be implemented as a structure extending from an outermost portion of the outer body 510.

That is, by forming the position of the support protrusion 530 to be aligned with the portion of the bracket 100 which is outside the mounting portion of the second bearing 32, even when the coupler 500a exerts a strong pressurizing force downward, the support protrusion 530 may be in contact with the bracket 100 first, thereby preventing damage to the second bearing 32 and noise occurrence in advance.

In addition, since the support protrusion 530 is formed in a structure extending from the outermost portion of the outer body 510, air flow generated due to an inflow between the bracket 100 and the coupler 500a may be blocked, and thereby the noise occurrence may be suppressed.

Meanwhile, the motor 1 may further include a sensing unit 600 which senses a degree of rotation of the rotating shaft 400.

The sensing unit 600 may include a sensing plate 610, a sensing magnet 620, a printed circuit board (PCB) 630, and a sensor 640.

The sensing plate 610 is coupled to the rotating shaft 400 and rotates therewith. In addition, the sensing magnet 620 is disposed at the sensing plate 610.

Further, the PCB 630 is installed at the bracket 100, and the sensor 640 may be disposed on the PCB 630 to face the sensing magnet 620.

The sensor 640 senses a degree of rotation of the sensing plate 610 in which the sensing magnet 620 is disposed and the rotating shaft 400 by sensing a degree of rotation of the sensing magnet 620.

A motor having a configuration according to the above-described embodiment of the present invention provides a support protrusion having a protruding structure at a lower end of a coupler to which an external apparatus is coupled, and the support protrusion is disposed to be aligned with a bracket portion that is outside a beating mounting portion.

Therefore, even when the coupler exerts a strong pressure in a downward direction, the supporting protrusion is in with the bracket first, and thereby damage to the bearing and noise occurrence can be prevented in advance.

In addition, since the support protrusion is formed in a structure extending from the outermost portion of the coupler, air flow generated due to an inflow between the bracket and the coupler can be blocked, and thereby the noise occurrence can be suppressed.

While the invention has been shown and described with reference to certain exemplary embodiments thereof, it will be understood by those skilled in the art that various changes in form and details may be made therein without departing from the spirit and scope of the invention as defined by the appended claims. In addition, it should be understood that those differences associated with the modifications and changes are included in the scope of the present invention as defined in the scope of the claims described herein.

What is claimed is:

1. A coupler coupled to a rotatable shaft of a motor, comprising:
    an outer body including a main body in a cylindrical shape and a first engaging portion formed to protrude inward from the main body;
    an inner body including a coupling portion coupled to a first engaging portion, and a second engaging portion formed to protrude downward in an axial direction of the rotatable shaft from the coupling portion; and
    a support protrusion formed to extend from the main body,
    wherein an end of the support protrusion is formed to protrude more than an end of the second engaging portion.

2. The coupler of claim 1, wherein the support protrusion is spaced apart from the second engaging portion.

* * * * *